(12) United States Patent
Kryzaniwskyj et al.

(10) Patent No.: US 8,007,004 B2
(45) Date of Patent: Aug. 30, 2011

(54) EXTERIOR AIRBAG PANEL

(75) Inventors: Tanja Kryzaniwskyj, Warren, MI (US); Robert A. Parks, Berkley, MI (US)

(73) Assignee: Toyoda Gosei Co. Ltd. (JP)

( * ) Notice: Subject to any disclaimer, the term of this patent is extended or adjusted under 35 U.S.C. 154(b) by 0 days.

(21) Appl. No.: 12/841,991

(22) Filed: Jul. 22, 2010

(65) Prior Publication Data

US 2011/0018246 A1    Jan. 27, 2011

Related U.S. Application Data

(60) Provisional application No. 61/228,233, filed on Jul. 24, 2009.

(51) Int. Cl.
*B60R 21/16* (2006.01)

(52) U.S. Cl. .................. 280/743.1; 280/743.2

(58) Field of Classification Search ............... 280/743.1, 280/743.2, 732
See application file for complete search history.

(56) References Cited

U.S. PATENT DOCUMENTS

| 5,454,595 | A | * | 10/1995 | Olson et al. ................ 280/743.1 |
| 6,773,027 | B2 | * | 8/2004 | Bohn et al. .................... 280/729 |
| 6,832,778 | B2 | * | 12/2004 | Pinsenschaum et al. ..... 280/739 |
| 7,543,850 | B2 | * | 6/2009 | Bachraty et al. ........... 280/743.1 |
| 7,654,561 | B2 | * | 2/2010 | Webber et al. ................ 280/729 |
| 7,722,080 | B2 | * | 5/2010 | Rose et al. ................. 280/743.2 |
| 7,748,738 | B2 | * | 7/2010 | Schneider .................... 280/740 |
| 2003/0209895 | A1 | * | 11/2003 | Gu ................................ 280/739 |
| 2005/0236822 | A1 | * | 10/2005 | Rose et al. .................... 280/739 |
| 2007/0013177 | A1 | * | 1/2007 | Abe ............................. 280/739 |
| 2008/0042412 | A1 | * | 2/2008 | Bachraty et al. ............. 280/742 |
| 2009/0033080 | A1 | * | 2/2009 | Sager ........................ 280/743.1 |
| 2009/0212538 | A1 | * | 8/2009 | Abe et al. ..................... 280/729 |
| 2009/0261563 | A1 | | 10/2009 | Niwa et al. |
| 2009/0261564 | A1 | | 10/2009 | Niwa et al. |

* cited by examiner

*Primary Examiner* — Faye M. Fleming
(74) *Attorney, Agent, or Firm* — Carlson Gaskey & Olds P.C.

(57) ABSTRACT

An example airbag arrangement includes an airbag that is moveable to an expanded position. The airbag has a contact area. A panel is secured exclusively to the airbag. A portion of the airbag extends through an aperture in the panel when the airbag is in the expanded position. The panel alters expansion of the contact area.

20 Claims, 2 Drawing Sheets

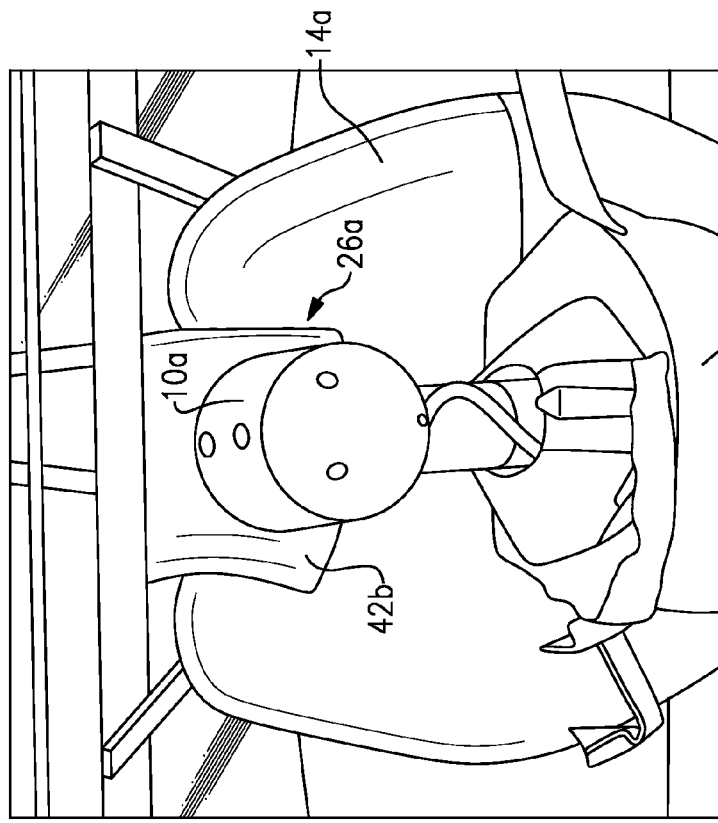
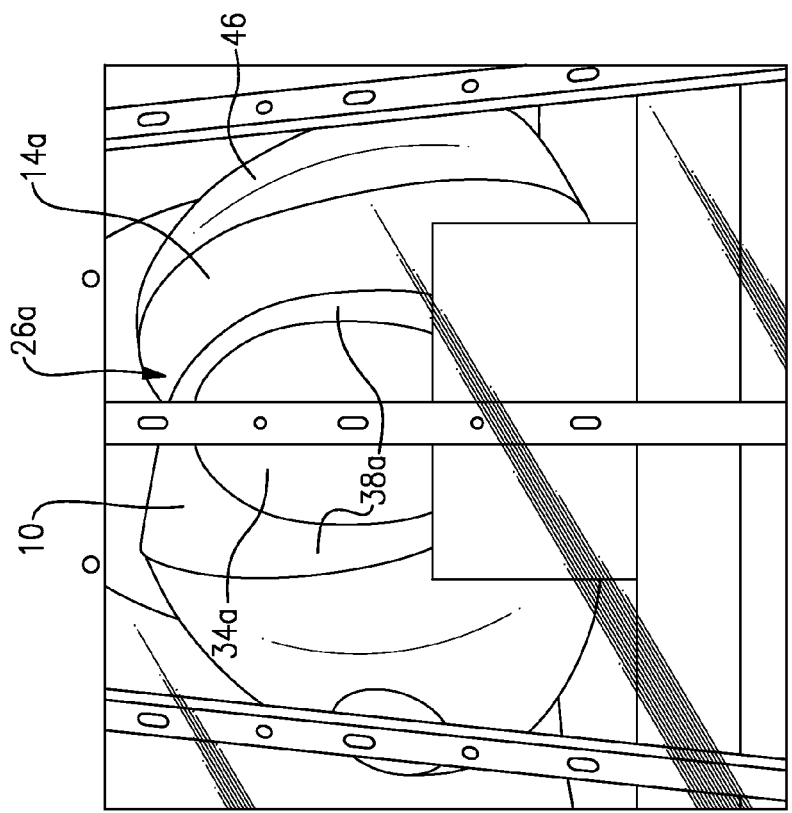

EXTERIOR AIRBAG PANEL

CROSS-REFERENCE TO RELATED APPLICATIONS

This application claims priority to U.S. Provisional Patent Application No. 61228233, which was filed on 24 Jul. 2009 and is incorporated herein by reference.

BACKGROUND

This disclosure relates to positioning an airbag during deployment using a panel secured to the exterior of the airbag.

Known airbag arrangements protect occupants of vehicles by absorbing forces generated during collisions, for example. Airbag arrangements are often used in conjunction with other vehicle safety systems, such as seat belts. The occupants, and the airbag arrangements, may be located in various areas of the vehicle.

Inflating an airbag of the airbag arrangement moves the airbag from a folded position to an expanded position. Forces transfer between an occupant and the airbag when the occupant contacts the expanded, or partially expanded, airbag. The orientation of the airbag can influence the transfer of forces between the airbag and the occupant. Manipulating the airbag to have a particular orientation when contacting the occupant is often difficult due to rapid inflation of the airbag from the folded position.

SUMMARY

An example airbag arrangement includes an airbag that is moveable to an expanded position. The airbag has a contact area. A panel is secured exclusively to the airbag. A portion of the airbag extends through an aperture in the panel when the airbag is in the expanded position. The panel alters expansion of the contact area.

Another example airbag arrangement includes an airbag configured to move to an expanded position. When the airbag is in the expanded position, the airbag has a contact area portion and an opposing base portion. A panel is secured to the airbag adjacent the contact area portion and the base portion. The panel includes tethered strips. The airbag is configured to move the tethered strips relative to each other when expanded to limit movement of the contact area toward an occupant.

An example method of positioning an airbag contact area includes expanding a hump of an airbag through an aperture in a panel that is secured to the airbag and moving portions of the panel relative to each other using the hump. The method limits movement of a contact area using the panel.

These and other features of the disclosed examples can be best understood from the following specification and drawings, the following of which is a brief description.

BRIEF DESCRIPTION OF THE FIGURES

FIG. 4 shows a front view of the FIG. 1 panel secured to an airbag that has expanded further than the FIG. 1 airbag.

FIG. 5 shows another rear view of the FIG. 1 panel secured to an airbag that has expanded further that the FIG. 1 airbag and is contacting an occupant.

DETAILED DESCRIPTION

Figure 1:
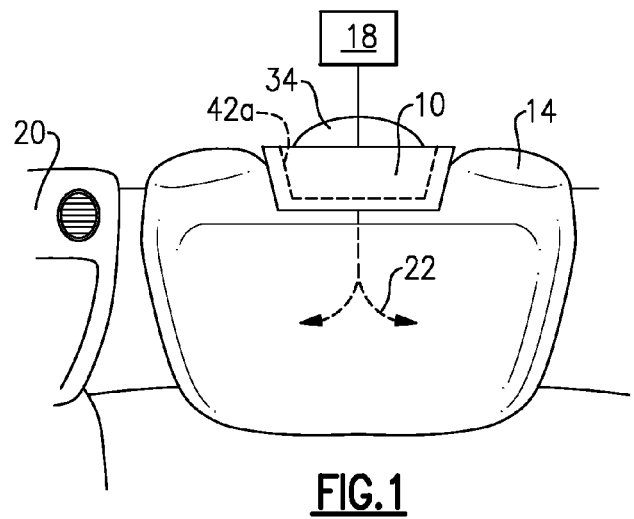
FIG. 1 shows an in position view of an example panel secured to a partially expanded airbag.
Figure 2:
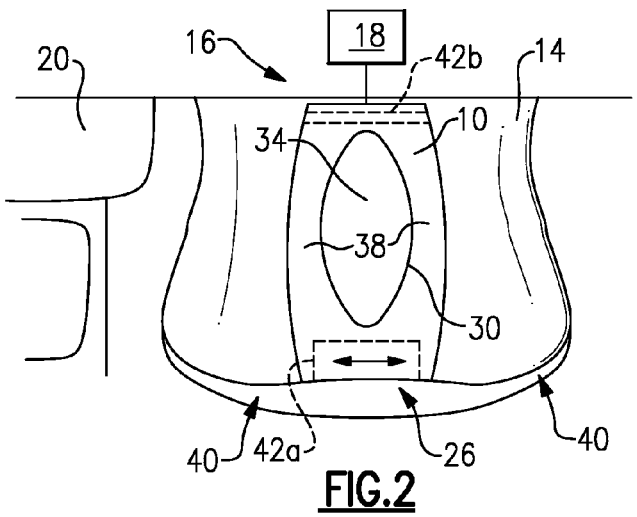
FIG. 2 shows a top view of the FIG. 1 panel secured to the partially expanded airbag.

Referring to FIGS. 1 and 2, an example airbag panel 10 is sewn to an airbag 14 to secure the panel 10 relative to the airbag 14. An inflator 18, represented schematically here, generates gas 22 for inflating the airbag 14. These figures show the airbag 14 in a partially expanded position.

In this example, stitches 42a and 42b secure opposing ends of the example panel 10 directly to an upper portion of the airbag 14. A lower portion of the airbag 14 does not include a panel.

In this example, some of the stitches 42a may extend into a contact area 26 of the expanded airbag 14. Generally, the contact area 26 receives an occupant's head during expansion of the airbag 14. The stitches 42b are located near a base 16 of the airbag 14. The base 16 connects the airbag 14 to a vehicle 20.

The example panel 10 is secured to the airbag 14 only with stitches 42a and 42b. Securing the panel 10 using only the stitches 42a and 42b (rather than, for example, securing the panel 10 to bolts holding the inflator 18) facilitates incorporating different widths of panels 10 into the airbag 14, and especially panels 10 that are wider than the inflator 18.

An airbag designer may change the panel 10 to another panel that is wider or narrower than the example panel 10 to change the expansion characteristics of the airbag 14. For example, if a designer desires the contact area 26 to be wider, the designer may select another panel 10 that is wider than the panel 10.

Other than the opposing ends of the panel 10 that are held by the stitches 42a and 42b, the panel 10 is free to move relative to the airbag 14. This freedom of movement is especially important in the contact area 26 because the relative movement between the panel 10 layer of material and the other portions of the airbag 14 facilitates absorbing forces as the occupant contacts the contact area 26. For example, when the occupant's head contacts the contact area 26, portions of the panel 10 that do not include the stitches 42a and 42b slide relative to other portions of the airbag 14. The sliding absorbs some of the forces of impact.

The panel 10 establishes an aperture 30, which is oval-shaped in this example. As the airbag 14 expands, a central portion of the airbag 14 protrudes through the aperture 30 forming a hump 34. The panel 10 spreads as the hump 34 grows during inflation and protrudes further through the aperture 30. More specifically, strips 38 (or legs) of the panel 10 move away from each other toward the sides of the vehicle 20 as the airbag 14 inflates. Spreading the strips 38 of the panel 10 limits expansion of the contact area 26 toward the front of the vehicle 20 in a direction X, especially when the airbag 14 is in the fully expanded position or very near the fully expanded position.

The contact area 26 is thus slightly recessed within the airbag 14 relative to other portions of the airbag 14 when the occupant contacts the airbag 14. In this example, areas 40 of the airbag 14 on each side of the panel 10 expand past the contact area 26 relative to the inflator 18. Accordingly, when the airbag 14 is expanded, the occupant contacts the areas 40 before the occupant's head contacts the contact area 26. Typically, the shoulders of the occupant contact the areas 40.

Recessing the contact area 26 in this way is sometimes effective for absorbing forces. A person skilled in the art and having the benefit of this disclosure would be able to design the aperture 30 and panel 10, and specifically the relationship of the strips 38 of the panel 10 to control the contact area 26 in a desired manner.

Figure 3:
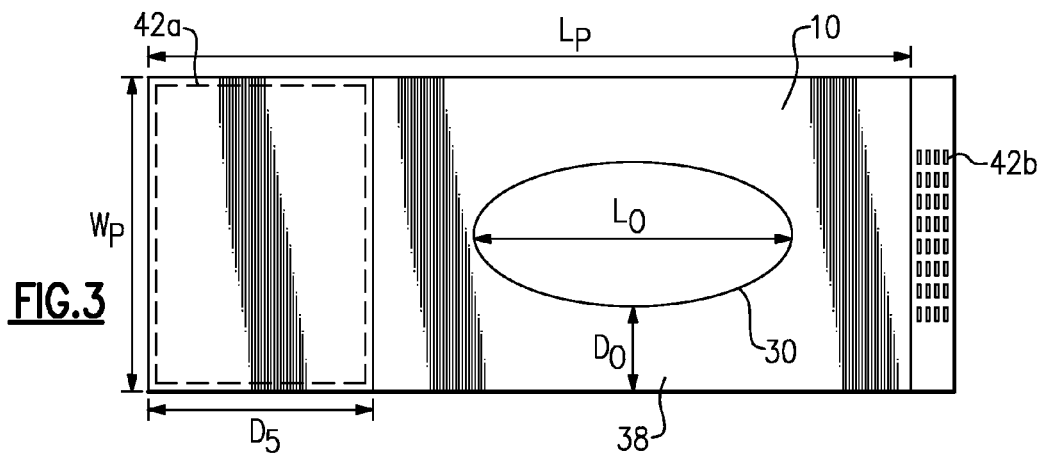
FIG. 3 shows a close-up view of the FIG. 1 panel.

FIG. 3 shows a top view of the example panel 10 in a relaxed position and separate from the airbag 14. In this example, the width $W_p$ of the panel 10 is between 200 mm and 300 mm. The length $L_p$ of the panel 10 from the leading edge to the stitches 42b is between 600 mm and 640 mm. The stitches 42a extend along the panel 10 a distance $D_s$ that is between 200 mm and 300 mm. In a relaxed position, the aperture 30 is an oval having a length $L_o$ that is between 220 mm and 300 mm. At their narrowest, the width $W_s$ of the strips 38 is between 50 mm and 70 mm. Example patterns of stitching 42a and 42b are also shown.

FIGS. 4 and 5 show another example expanded airbag 14a, an example panel 10a, and an occupant 50. The head of the occupant 50 is shown positioned within the contact area 26a of the airbag 14a. The recessed position of the contact area 26a relative to the other portions of the airbag 14a facilitates guiding the head of the occupant 50 into the contact area 26a. In this example, the hump 34a of the airbag 14a contacts the windshield 46 of a vehicle 20a, which facilitates separating the strips 38a of the panel 10 because the width of the hump 34a increases. Notably, the panel 10a has different stitching 42b than the panel 10a of FIGS. 1-3.

Features of the disclosed examples include controlling expansion of an airbag using a panel that is secured exclusively to the airbag. That is, the panel does not connect to the inflator or a bracket within the vehicle. Another feature of these examples includes controlling expansion of an airbag without using internal tethers.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

The invention claimed is:

1. An airbag arrangement, comprising:
an airbag moveable to an expanded position;
a contact area of the airbag; and
a panel secured exclusively to the airbag, wherein a portion of the airbag extends through an aperture in the panel when the airbag is in the expanded position to alter expansion of the contact area.

2. The airbag arrangement of claim 1, wherein a first end of said panel is secured to the airbag adjacent said contact area, and a second end of said panel is secured to the airbag adjacent a base of said airbag.

3. The airbag arrangement of claim 2, wherein stitches secure the first end and the second end to the airbag.

4. The airbag arrangement of claim 1, wherein the airbag includes an upper airbag section and a lower airbag section, the panel secured to the upper airbag section.

5. The airbag arrangement of claim 1, wherein the portion of the airbag extending through the aperture establishes a hump in an upper airbag section.

6. The airbag arrangement of claim 5, wherein the hump is configured to separate strips of the panel.

7. The airbag arrangement of claim 1, wherein the panel is secured directly to an exterior surface of the airbag.

8. The airbag arrangement of claim 1, wherein a portion of the airbag extends through the aperture in the panel when the airbag is in the expanded position to constrain expansion of the contact area.

9. An airbag arrangement, comprising:
an airbag configured to move to an expanded position, the airbag having a contact area portion and an opposing base portion in the expanded position; and
a panel secured directly to an exterior surface of the airbag adjacent the contact area portion and the base portion, the panel including tethered strips, wherein the airbag is configured to move the tethered strips relative to each other when expanded to limit movement of the contact area toward an occupant.

10. The airbag arrangement of claim 9, wherein the airbag is configured to move one of the strips in a first direction and another of the tethered strips in an opposing, second direction.

11. The airbag arrangement of claim 9, wherein the tethered strips each define at least a portion of an aperture established within a panel.

12. The airbag arrangement of claim 11, wherein the airbag in the expanded position includes a hump extending through the aperture.

13. The airbag arrangement of claim 11, wherein the aperture is oval-shaped.

14. The airbag arrangement of claim 9, wherein the panel is secured exclusively to the airbag.

15. The airbag arrangement of claim 9, wherein the panel is between 200 mm and 300 mm wide.

16. The airbag arrangement of claim 9, wherein the contact area corresponds to an area of the airbag adapted to contact a head of the occupant.

17. A method of positioning an airbag contact area, comprising:
expanding a hump of an airbag through an aperture in a panel that is secured to the airbag;
moving portions of the panel relative to each other using the hump; and
limiting movement of a contact area using the panel.

18. The method of claim 17, wherein the panel is secured exclusively to the airbag.

19. The airbag arrangement of claim 9, wherein the exterior surface is configured to be contacted by an occupant when the airbag is in the expanded position.

20. The airbag arrangement of claim 9, wherein the airbag in the expanded position defines an airbag interior, and the exterior surface of the airbag faces away from the airbag interior.

* * * * *